(12) United States Patent
Verheyden

(10) Patent No.: US 8,926,105 B2
(45) Date of Patent: Jan. 6, 2015

(54) VEHICLE MIRROR ADJUSTMENT METHOD AND SYSTEM

(75) Inventor: Karl Frans Mario Verheyden, Tielt-Winge (BE)

(73) Assignee: NXP, B.V., Eindhoven (NL)

( * ) Notice: Subject to any disclaimer, the term of this patent is extended or adjusted under 35 U.S.C. 154(b) by 566 days.

(21) Appl. No.: 13/001,011

(22) PCT Filed: Jun. 22, 2009

(86) PCT No.: PCT/IB2009/052678
§ 371 (c)(1),
(2), (4) Date: Dec. 22, 2010

(87) PCT Pub. No.: WO2009/156941
PCT Pub. Date: Dec. 30, 2009

(65) Prior Publication Data
US 2011/0122520 A1   May 26, 2011

(51) Int. Cl.
*B60R 1/04* (2006.01)
*B60R 1/06* (2006.01)
*B60R 1/062* (2006.01)

(52) U.S. Cl.
CPC ............... *B60R 1/0607* (2013.01); *B60R 1/04* (2013.01); *B60R 1/062* (2013.01); *B60R 2300/105* (2013.01); *Y10S 359/90* (2013.01)
USPC ........... 359/843; 359/865; 359/872; 359/900; 348/148; 701/49

(58) Field of Classification Search
CPC .............. B60R 1/04; B60R 1/06; B60R 1/062
USPC .......... 359/843, 865, 872, 900; 348/143, 148; 382/115, 117; 701/49

See application file for complete search history.

(56) References Cited

U.S. PATENT DOCUMENTS

| | | | |
|---|---|---|---|
| 4,625,329 A | 11/1986 | Ishikawa et al. | |
| 5,694,259 A * | 12/1997 | Brandin | 359/843 |
| 5,798,575 A * | 8/1998 | O'Farrell et al. | 307/10.1 |
| 6,340,850 B2 * | 1/2002 | O'Farrell et al. | 307/10.1 |
| 6,397,137 B1 | 5/2002 | Alpert et al. | |
| 6,400,835 B1 | 6/2002 | Lemelson et al. | |

(Continued)

FOREIGN PATENT DOCUMENTS

| | | |
|---|---|---|
| DE | 198 52 873 A1 | 5/2000 |
| DE | 200 10 607 U1 | 12/2001 |

(Continued)

OTHER PUBLICATIONS

RD-471005 A, Jul. 2003, WIPO, Forman.*

(Continued)

*Primary Examiner* — Ricky D Shafer

(57) ABSTRACT

The present invention relates to a method and system of automatically adjusting a mirror (14, 16, 18) in a vehicle (10) to provide a driver (1) with an optimized rear view. A camera (24, 26, 28) is provided that is directed at the adjustable mirror (14, 16, 18). A camera capture area (60) is defined in the adjustable mirror (14, 16, 18), and the mirror (14, 16, 18) is automatically adjusted until the eyes (50) of the driver (1) are captured by the camera (24, 26, 28) within the capture area (60).

16 Claims, 2 Drawing Sheets

(56) References Cited

U.S. PATENT DOCUMENTS

| | | | |
|---|---|---|---|
| 6,840,637 B2 * | 1/2005 | Wang ........................ | 359/843 |
| 7,354,166 B2 * | 4/2008 | Qualich et al. ............. | 359/843 |
| 2008/0158357 A1 * | 7/2008 | Connell et al. ............. | 348/148 |

FOREIGN PATENT DOCUMENTS

| | | |
|---|---|---|
| EP | 0 793 585 B1 | 2/2000 |
| GB | 2 315 136 A | 1/1998 |
| JP | 60-179357 A | 9/1985 |
| JP | 6-262982 A | 9/1994 |
| JP | 2007-045217 A | 2/2007 |
| KR | 10-20020007646 A | 1/2002 |
| KR | 10-20040079700 A | 9/2004 |

OTHER PUBLICATIONS

International Search Report and Written Opinion for Int'l patent appln. No. PCT/IB2009/052678 (Sep. 22, 2009).

* cited by examiner

VEHICLE MIRROR ADJUSTMENT METHOD AND SYSTEM

The present invention relates to a method of automatically adjusting a mirror in a vehicle to provide a driver with an optimized rear view.

The present invention further relates to a mirror adjustment system for automatically adjusting a mirror in a vehicle to provide a driver with an optimized rear view.

Ongoing improvements in integrated circuit (IC) technology such as higher reliability and feature size shrinkage have facilitated the integration of a wide variety of electronically controlled functionality in the automotive application domain. For instance, different types of automated driver position adjustment functionality can now be found in many vehicles. An example of such automated driver position recognition is the automatic adjustment of mirrors such as the wing mirrors and the internal rear view mirror to ensure that the driver's rear view is optimized, thereby improving road safety.

Many examples of such automated mirror adjustment systems exist. For instance, Korean patent application KR 10-20020007646 A discloses an automatic mirror adjustment system in which the face of a driver is captured by a camera in a roof panel front of the driver, with an image processing unit arranged to detect the vertical eye position of the driver. The system further comprises an ultrasonic sensor for capturing the horizontal face position of the driver. The mirror positions are calculated from the detected vertical eye position of the driver and the horizontal face position of the driver.

Korean patent application KR 10-20040079700 A discloses a device and method for automatically adjusting the angle or a vehicle mirror. A camera installed in a roof panel is arranged to capture the face of the driver and derive the vertical eye position of the driver, with a distance detecting unit arranged to detected the distance between the roof panel and the face of the driver and a seat position sensor arranged to detect the seat position. The mirror positions are calculated from the detected vertical eye position, distance and seat position.

Japanese patent publication No. 60-179357 discloses a mirror adjustment system in which the driver's face is illuminated and the reflected light is detected by a pair of image detectors located in the vehicle dashboard. The mirror position is adjusted in response to the image sensors.

The prior art systems have the disadvantage that they are relatively complex and require the detection of several different parameters before the mirror can be accurately adjusted.

The present invention seeks to provide a method of automatically adjusting a mirror in a vehicle to provide a driver with an optimized rear view that is less complex than the prior art methods.

The present invention further seeks to provide mirror adjustment system for automatically adjusting a mirror in a vehicle to provide a driver with an optimized rear view that is less complex than the prior art methods.

According to a first aspect of the present invention, there is provided a method of automatically adjusting a mirror in a vehicle to provide a driver with an optimized rear view, the method comprising providing a camera directed at the adjustable mirror; defining a camera capture area in the adjustable mirror; and adjusting the mirror until the eyes of the driver are captured by the camera within the capture area.

By directing the camera at the mirror instead of directly at the face of the driver, the eye position of the driver can be directly correlated with the optimal rear view of the driver without requiring detailed knowledge about the exact three-dimensional location of the driver's head in the vehicle. Consequently, there is no need to explicitly determine three-dimensional head position coordinates, which dramatically reduces the number of steps required to adjust the mirror to its optimal position.

The capture area may be predefined. Alternatively, the step of defining the camera capture area comprises manually adjusting the mirror; detecting, with said camera, the position of the eyes of the driver in the manually adjusted mirror; and defining the camera capture area around the detected position of the eyes. In this case, the eye position preferred by the driver can be used to adjust the mirror accordingly.

In an embodiment, said adjusting step is executed when the driver is looking into the adjustable mirror. Face recognition algorithms are capable of detecting eyes focusing on an object such as the adjustable mirror. This can be used to only adjust the mirror when the driver is using the mirror, thereby taking variations in the head position of the driver caused by turning his head to look into different mirrors into account.

In another embodiment, the adjustable mirror is located inside the vehicle, the method further comprising the steps of detecting the border of the adjustable mirror; defining an optimal position of said border in the capture area of the camera; and adjusting the mirror to bring its border in the defined optimal position. This ensures that the axis perpendicular to the plane of the internal mirror is also brought in the desired orientation, thus further improving the accuracy of the mirror adjustment.

According to a further aspect of the present invention, there is provided a mirror adjustment system comprising a camera having an output; a processor having an input coupled to the camera output, said processor comprising object recognition algorithms for detecting the eyes of a driver in a defined capture area of a vehicle mirror with said camera, and having an output for providing a signal for adjusting the vehicle mirror in response to said image recognition algorithms.

Such a system, which implements the method of the present invention, is capable of accurately adjusting a mirror whilst requiring only a few parameters to facilitate the adjustment.

The system of the present invention may be integrated in a vehicle further comprising an adjustable mirror, wherein the camera of the system is directed at the adjustable mirror, and the adjustable mirror is coupled to the output of the system processor. Such a vehicle benefits from an improved road safety experience for the driver.

The vehicle mirror may be an external wing mirror, in which case the system camera can be located on the outside of the vehicle or on the inside of the vehicle looking at the external mirror through one of the vehicle's windows. The vehicle may further comprise a plurality of adjustable mirrors, in which case the mirror adjustment system may comprise a respective camera for each adjustable mirror.

Embodiments of the invention are described in more detail and by way of non-limiting examples with reference to the accompanying drawings, wherein FIG. 1 shows a vehicle comprising a mirror adjustment system in accordance with an embodiment of the present invention;

It should be understood that the Figures are merely schematic and are not drawn to scale. It should also be understood that the same reference numerals are used throughout the Figures to indicate the same or similar parts.

Figure 1:
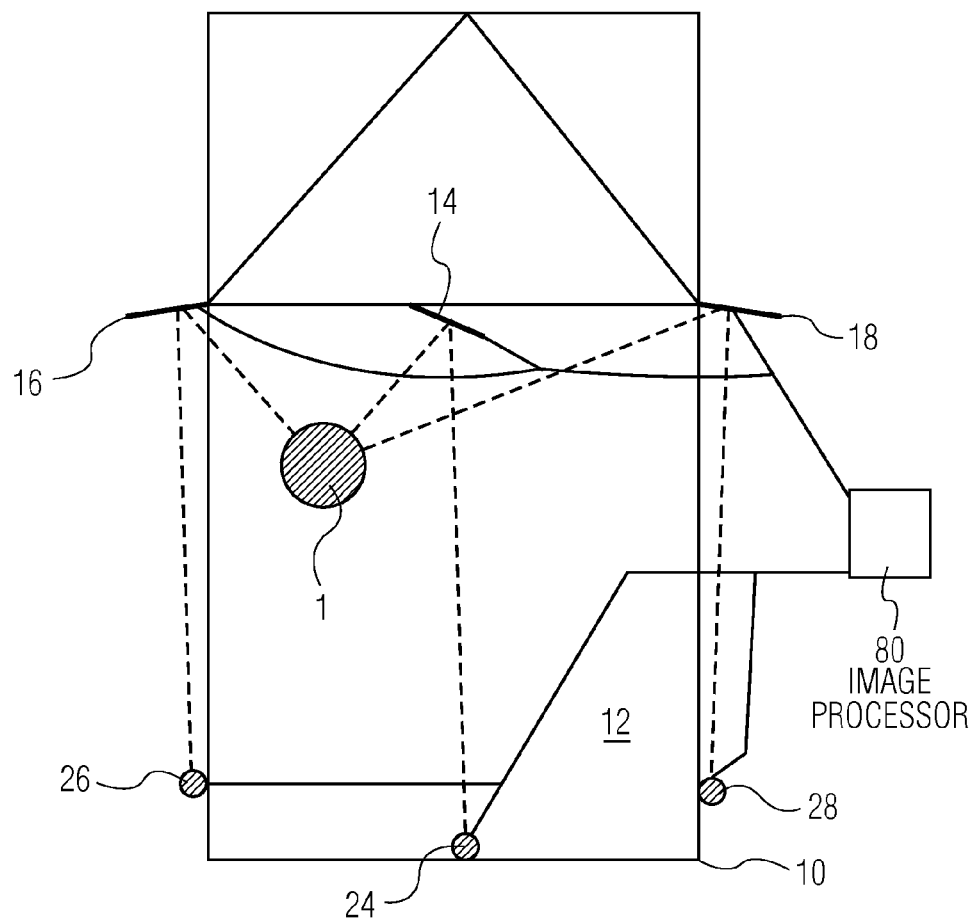

In FIG. 1, a driver 1 is positioned within the cabin 12 of a vehicle 10. The vehicle 10 comprises a central rear view mirror 14 positioned within the cabin 12 and a left wing mirror 16 and a right wing mirror 18 positioned at the sides of the vehicle. Each mirror is automatically adjustable. Since automatic adjustment means for mirrors, e.g., actuators, electromotors and so on are well known to the skilled person, these adjustment means are not discussed in further detail for the sake of brevity.

Each adjustable mirror 14 16 and 18 is arranged to receive a control signal. from an image processor (80). The image processor 80 is arranged to generate respective mirror adjustment signals from images received from respective cameras 24, 26 and 28, which are arranged to capture a mirror image from respective mirrors 14, 16 and 18. The cameras 26 and 28 are typically integrated in the bodywork of the vehicle 10 such that these cameras 26 and 28 have a minimal detrimental effect on the air resistance of the vehicle 10 in motion. The camera 24 may he mounted in the roof of the cabin 12, e.g., in the proximity of the rear central window of the vehicle 10.

The concept of the present invention is based on the insight that although the same or different drivers 1 may adopt different positions within the cabin 12, with each position requiring a correspondingly different mirror position to provide the driver 1 with an optimal rear view, in an optimized position, the eyes of the driver 1 are typically focused on the same region of the reflecting surface of each of the mirrors 14, 16 and 18. Consequently, because the cameras 24, 26 and 28 have a fixed orientation in respect of the mirrors 14, 16 and 18 respectively, and therefore a fixed orientation with the desired driver view, the optimization of the respective mirror positions can be simplified to adjusting the mirror such that the eyes of the driver 1 are located within the aforementioned region of the mirror surface. This region will be referred to as the capture area.

Figure 2:
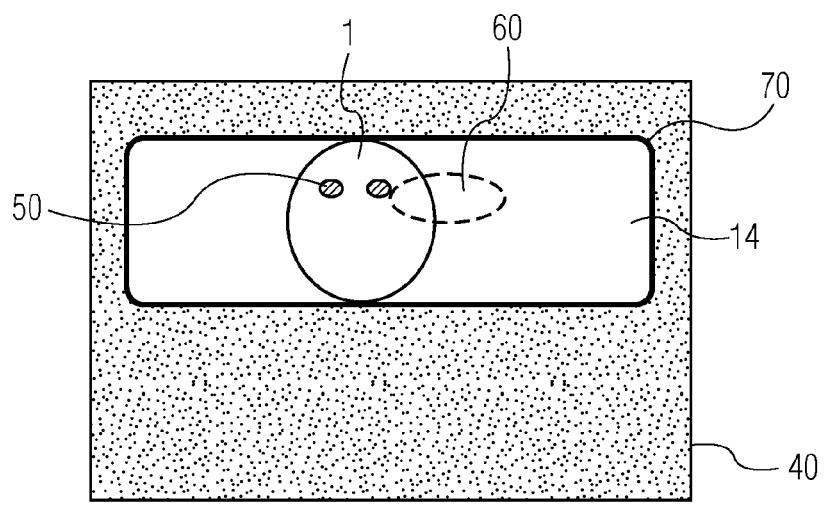
FIG. 2 shows an aspect of this system in greater detail.

By using face recognition techniques, the relative position of the reflection of the eyes of the driver in the mirrors 14, 16 and 18 can be determined. FIG. 2 shows the image 40 captured by the camera 24. In order to adjust the mirror 14 to its optimal position, the eyes 50 of the driver 1 both have to be captured inside the capture area 60. The capture area 60 has to be in a pre-defined location on the mirror surface to ensure that the mirror 14 adopts the optimal viewing angle for the driver 1.

The camera 24 captures an image 40 containing the boundaries of the rear view mirror 14. Inside this image, the eyes 50 of the driver 1 are identified using face recognition algorithms. Such algorithms are well-known to the skilled person, and are therefore not discussed in any detail for the sake of brevity only. The capture area 60 is a fixed-size area that is in a fixed relative location to the rear view mirror border. As previously explained, this relative location is only dependent on the position of the mirror 14 and the camera 24. There are various ways in how this relative position may be determined. In an embodiment, the mirror 14 is manually adjusted once to determine the optimal viewing angle and the capture area 60. The capture area 60 is subsequently stored in a memory accessible by the image processor. This one-time set-up can be done by the end-user, by the dealer, in the factory or once for the first model and then use the same settings in the factory for all cars of this model. In a further embodiment, the driver 1 may trigger the mirror adjustment system to redefine the capture area 60, e.g. by manually adjusting the mirror and defining a new capture area 60 around the actual eye position of the driver 1 in case the driver 1 is not satisfied with the originally defined capture area 60.

It is emphasized that the cameras used in the system of the present invention may be any suitable camera, which may include a camera sensitive to the visible part of the electromagnetic spectrum or a camera sensitive to the infrared part of the electromagnetic spectrum.

As can be seen in FIG. 2, the eyes 50 of the driver 1 are not within the capture area 60, so the position of the mirror 14 must be adjusted. This is done by controlling e.g. an electrical motor connected to the mirror 14. The image processor determines the eye position in the image captured by the camera 24 using the available object recognition algorithms, and generates a mirror adjustment control signal from the displacement of the eyes 50 relative to the capture area 60.

In this case, the image of the eyes 50 captured by the camera 24 must move to the right, so the mirror 14 needs to be rotated clock-wise around the vertical axis. It can further be observed in FIG. 2 that the image of the eyes 50 must also move slightly lower, so the mirror 14 needs to be rotated clock-wise around the horizontal axis in the plane of the mirror 14.

In an embodiment, the mirror 14 is adjusted incrementally. After an adjustment with one increment, a new image in the mirror 14 is captured by the camera 24. If the eyes 50 are not yet within the capture area 60, this aspect of the method of the present invention is repeated until the eyes 50 are within the capture area 60.

It will be appreciated that although the above principle is explained for the central rear view mirror 14, the same control principle can be applied to the wing mirrors 16 and 18 using cameras 26 and 28. It will further be appreciated that not all mirrors need to be adjustable by the mirror adjustment system of the present invention; the system may be used to control any number of mirrors of a vehicle 10.

At this point, it is noted that the internal rear view mirror 14 typically has a third degree of freedom, which is the substantially horizontal axis orthogonal to the plane of the mirror 14. In an embodiment of the method of the present invention, to adjust this position, the border 70 of the rear view mirror 14 must be taken into account. The position of the border 70 is adjusted until it coincides with a predefined border position. The predefined border position may also be set by initial manual adjustment and subsequently stored in a memory accessible by the image processor, as previously explained for the capture area 60.

As previously explained, the mirror adjustment system may only become active if the driver 1 is looking into a mirror such as mirror 14. This can be implemented on the image processor by means of any suitable face recognition algorithms that can recognize the eyes 50 focusing on an object, i.e. the adjustable mirror. Such algorithms are known per se. This has the advantage that the different positions of the head of the driver 1 when looking in the different mirrors is taken into account.

Figure 3:
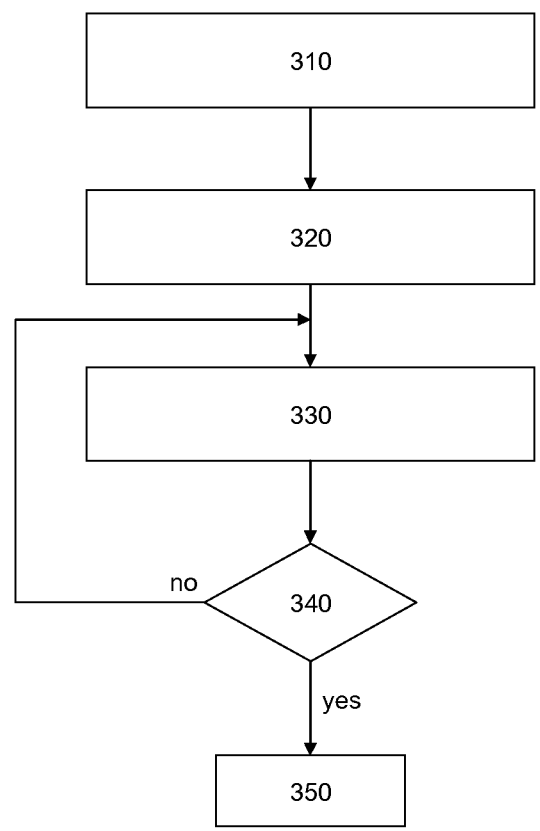
FIG. 3 shows a flowchart of an embodiment of the method of the present invention.

FIG. 3 shows a flow chart of an embodiment of the method of the present invention. In a first step 310, a vehicle 10 is provided with a camera, e.g. camera 24, which is mounted inside the vehicle 10 such that it can capture an image of a mirror, e.g. mirror 14.

In the next step 320, the mirror is adjusted such that the driver 1 has the optimal rear view in said mirror. The eye position in the mirror is captured and a capture area 60 around the eyes 50 is defined and stored. The location of this capture area 60 in the mirror is typically the same for every driver 1; it is merely the orientation of the mirror that is different for different drivers.

In step 330, which may be executed when a new driver 1 enters the vehicle 10, the mirror position is adjusted to locate the eyes of the driver 1 within the capture area 60. This step may be initiated by a driver 1 looking into the mirror. In step 340, the method checks if the adjustment step has indeed located the eyes 50 within the capture area 60. If this is not the case, the method return to step 330; otherwise, the method terminates in step 350.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of automatically adjusting a mirror in a vehicle to provide a driver with an optimized rear view, the method comprising:
   providing a camera directed at the mirror;
   defining a camera capture area in the mirror; and
   adjusting the mirror until both eyes of the driver are captured by the camera within the camera capture area, wherein an eye position of the driver is correlated with the optimized rear view;
   wherein the mirror is located inside the vehicle;
   defining an optimal position of a border of the mirror in a further capture area of the camera;
   detecting the border of the mirror; and
   adjusting the mirror to bring the border in the defined optimal position.

2. A method according to claim 1, wherein the step of defining the camera capture area further comprises:
   manually adjusting the mirror;
   detecting, with said camera, a position of both eyes of the driver in the manually adjusted mirror; and
   defining the camera capture area around the detected position of both eyes of the driver.

3. The method of claim 2, further comprising:
   storing the defined camera capture area in a memory.

4. The method according to claim 1, wherein the adjusting step comprises repeating the steps of adjusting the mirror and checking if both eyes of the driver are within the camera capture area until both eyes are captured within the camera capture area.

5. The method according to claim 1, wherein said adjusting step is executed when the driver is looking into the mirror.

6. The method of claim 1, wherein the camera capture area is predefined.

7. The method of claim 1, further comprising:
   generating a mirror adjustment control signal from displacement of both eyes relative to the camera capture area.

8. The method of claim 1, further comprising:
   storing the optimal position of the border in a memory.

9. A mirror adjustment system comprising:
   a camera having an output;
   a processor having an input coupled to the camera output, said processor comprising object recognition algorithms for detecting both eyes of a driver in a capture area of an adjustable mirror, detecting a border of the adjustable mirror with said camera, and having an output for providing a signal for adjusting the adjustable mirror in response to said object recognition algorithms, wherein an eye position of the driver is directly correlated with an optimized rear view: and
   wherein the adjustable mirror is a mirror internal to the vehicle, and the processor is configured to define an optimal position of said border in the capture area of the camera, detect the border of the adjustable mirror, and adjust the adjustable mirror to bring the border in the defined optimal position.

10. The mirror adjustment system according to claim 9, wherein the processor is configured to define the capture area in response to a manual adjustment of the adjustable mirror.

11. The mirror adjustment system of claim 10, wherein the defined capture area is stored in a memory.

12. The mirror adjustment system according to claim 9, wherein the processor is responsive to the driver looking into the vehicle internal mirror.

13. A vehicle comprising:
   the mirror adjustment system according to claim 9, wherein the camera is directed at the adjustable mirror, and the adjustable mirror is coupled to the output of the processor.

14. The vehicle according to claim 13, wherein the vehicle comprises a plurality of adjustable mirrors and the mirror adjustment system comprises a respective camera for each adjustable mirror.

15. The mirror adjustment system of claim 9, wherein the capture area is predefined.

16. The mirror adjustment system of claim 9, wherein a mirror adjustment control signal is generated from displacement of both eyes relative to the capture area.

* * * * *